(12) United States Patent
Jacobson et al.

(10) Patent No.: US 8,243,735 B2
(45) Date of Patent: **\*Aug. 14, 2012**

(54) SYSTEM FOR FORWARDING PACKETS WITH HIERARCHICALLY STRUCTURED VARIABLE-LENGTH IDENTIFIERS USING AN EXACT-MATCH LOOKUP ENGINE

(75) Inventors: Van L. Jacobson, Woodside, CA (US); James D. Thornton, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/638,478

(22) Filed: Dec. 15, 2009

(65) Prior Publication Data

US 2010/0195654 A1 Aug. 5, 2010

Related U.S. Application Data

(60) Provisional application No. 61/148,871, filed on Jan. 30, 2009.

(51) Int. Cl.
*H04L 12/28* (2006.01)
*H04L 12/56* (2006.01)
(52) U.S. Cl. ........................................ 370/392
(58) Field of Classification Search ............... None
See application file for complete search history.

(56) References Cited

U.S. PATENT DOCUMENTS

| 5,870,605 | A | 2/1999 | Bracho |
| 6,233,646 | B1 * | 5/2001 | Hahm ............................... 711/2 |
| 2006/0173831 | A1 | 8/2006 | Basso |

FOREIGN PATENT DOCUMENTS

| WO | 03005288 A2 | 1/2003 |
| WO | 03005288 A3 | 1/2003 |
| WO | 03049369 A2 | 6/2003 |

OTHER PUBLICATIONS

Waldvogel, Marcel "Fast Longest Prefix Matching: Algorithms, Analysis, and Applications", A dissertation submitted to the Swiss Federal Institute of Technology Zurich, 2002.

* cited by examiner

*Primary Examiner* — Ayaz Sheikh
*Assistant Examiner* — Blanche Wong
(74) *Attorney, Agent, or Firm* — Shun Yao; Park, Vaughan, Fleming & Dowler LLP

(57) ABSTRACT

One embodiment provides a system for forwarding packets with hierarchically structured variable-length identifiers (HS-VLIs), wherein the computer includes a processor. During operation, the system converts an HSVLI into a number of fixed-length addresses, wherein the HSVLI indicates a piece of content and is hierarchically structured, and comprises contiguous components ordered from a most general level to a most specific level. In addition, the length of a respective HSVLI is not fixed. The system further performs an effective longest-prefix-match lookup by performing multiple exact-match lookups based at least on the fixed-length addresses.

24 Claims, 9 Drawing Sheets

SYSTEM FOR FORWARDING PACKETS WITH HIERARCHICALLY STRUCTURED VARIABLE-LENGTH IDENTIFIERS USING AN EXACT-MATCH LOOKUP ENGINE

RELATED APPLICATION

This application claims the benefit of U.S. Provisional Application No. 61/148,871, entitled "OPTIMIZED CCN FORWARDING BY ADAPTATION OF EXISTING LOOKUP ENGINES FOR VARIABLE LENGTH CONTENT NAMES," by inventors Van Jacobson and James Thornton, filed 30 Jan. 2009.

The subject matter of this application is related to the subject matter in the following applications:

- U.S. patent application Ser. No. 12/123,344, entitled "VOICE OVER CONTENT-CENTRIC NETWORKS," by inventors Paul Stewart, Van Jacobson, Michael Plass, and Diana Smetters, filed 19 May 2008; and
- U.S. patent application Ser. No. 12/332,560, entitled "METHOD AND APPARATUS FOR FACILITATING COMMUNICATION IN A CONTENT-CENTRIC NETWORK," by inventor Van Jacobson, filed 11 Dec. 2008, the disclosures of which are incorporated by reference in their entirety herein.

The subject matter of this application is related to the subject matter in a co-pending non-provisional application by the same inventors as the instant application entitled "SYSTEM FOR FORWARDING A PACKET WITH A HIERARCHICALLY STRUCTURED VARIABLE-LENGTH IDENTIFIER," having Ser. No. 12/565,005 and filing date 23 Sep. 2009, the disclosure of which is incorporated in its entirety.

BACKGROUND

1. Field

The present disclosure relates generally to facilitating communication over a data network. More specifically, the present disclosure relates to a method for adapting an exact-match lookup engine to hierarchically structured variable-length identifiers.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively inadequate for meeting the ever-changing network demands.

In general, a network device, such as an IP router or Ethernet switch, receives a packet at one of its input ports (e.g., a network interface). The device then performs a lookup to identify an output port to which the packet should be forwarded based on the packet's destination address. An IP router typically uses a longest-prefix-match lookup engine, whereas an Ethernet switch uses an exact-match lookup engine. These devices are not adapted to process a packet with a variable-length identifier.

SUMMARY

One embodiment provides a system for forwarding packets with hierarchically structured variable-length identifiers (HSVLIs), wherein the computer includes a processor. During operation, the system converts an HSVLI into a number of fixed-length addresses, wherein the HSVLI indicates a piece of content and is hierarchically structured, and comprises contiguous components ordered from a most general level to a most specific level. In addition, the length of a respective HSVLI is not fixed. The system further performs an effective longest-prefix-match lookup by performing multiple exact-match lookups based at least on the fixed-length addresses.

In a variation on this embodiment, converting the HSVLI into a number of fixed-length addresses involves generating a number of prefixes of the HSVLI, wherein a respective prefix indicates one or more contiguous components beginning with a component at the most general level. The system further converts each prefix of the HSVLI into at least one fixed-length address.

In a further variation, converting each prefix involves indicating the number of components in the prefix with a predetermined number of bits out of the fixed-length address and indicating a hash value derived from the prefix with the remaining bits of the fixed-length address.

In a further variation, performing the effective longest-prefix match involves iteratively performing the following operations, from the shortest prefix to the longest prefix: determining forwarding information for the fixed-length address corresponding to a respective prefix using an exact-match lookup; and selecting forwarding information associated with the prefix with the most components, which has been determined with the exact-match lookup.

In a further variation, the forwarding information indicates at least one output port.

In a further variation, the exact-match lookup returns a result that includes one or more of the following indications: whether a match is found; whether a match is found and a further match is available for a prefix with additional components; the number of additional components needed to obtain a further match for a prefix with additional components; and a literal value corresponding to a match for the prefix, wherein the literal value can be loaded into a number of reserved bits in the fixed-length address, thereby facilitating subsequent lookups and reducing the chance of address collisions.

In a variation on this embodiment, the exact-match lookup engine comprises one or more of a hash table, a direct lookup array, and a binary content-addressable memory (CAM).

In a variation on this embodiment, a component in the HSVLI comprises one or more of a globally routable name, an organizational name, a version identifier, and a digest.

BRIEF DESCRIPTION OF THE FIGURES

In the figures, like reference numerals refer to the same figure elements.

DETAILED DESCRIPTION

Overview

Figure 1:
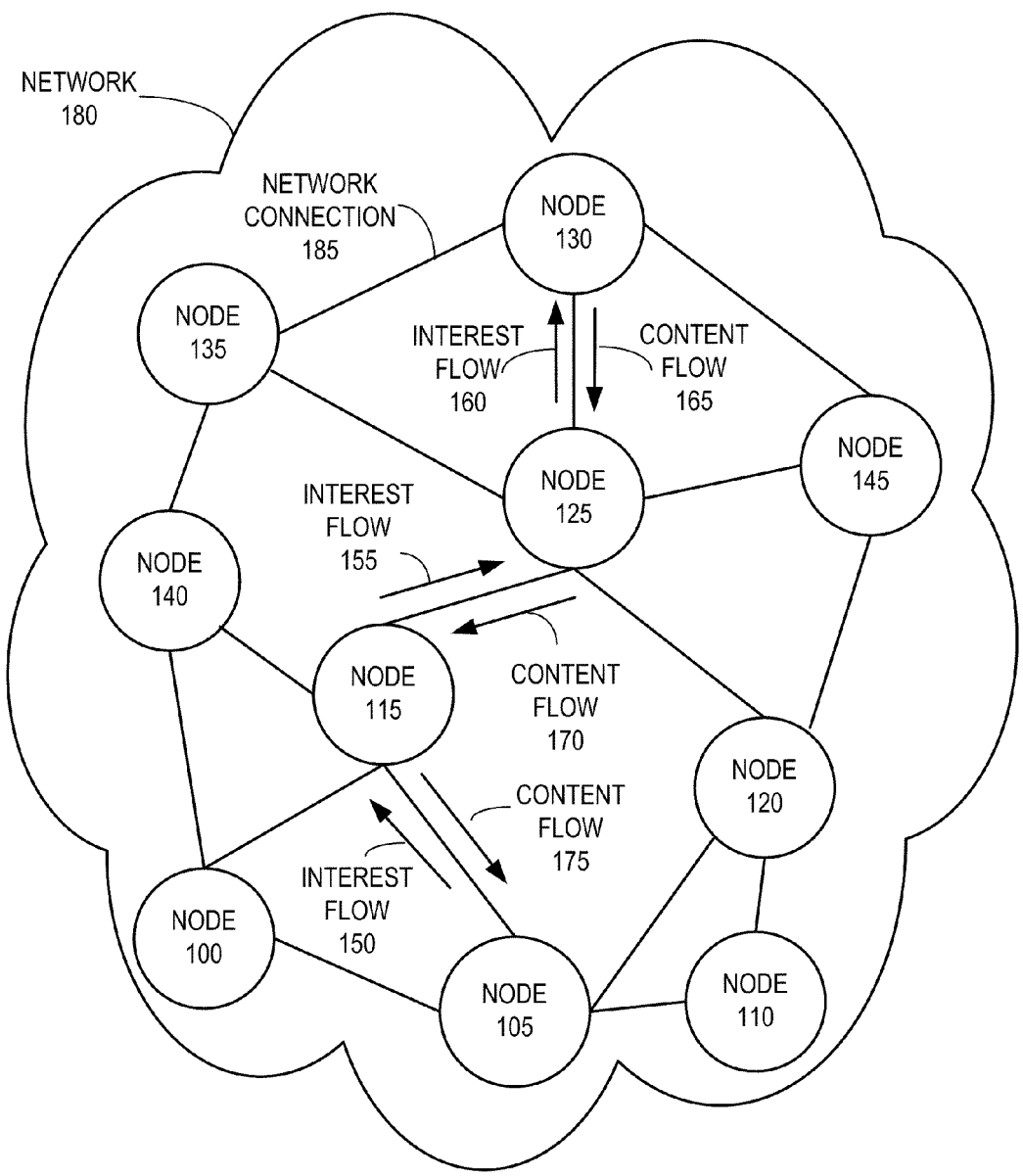
FIG. 1 illustrates an exemplary network where packets have hierarchically structured variable-length identifiers (HSVLIs) in accordance with an embodiment.

In embodiments of the present invention, the problem of adapting an exact-match lookup engine to perform a longest-prefix match for a variable-length identifier is solved by hashing the identifier to multiple fixed-length keys. Embodiments of the present invention involve adapting an existing exact-match lookup engine for fixed-length address (such as Ethernet MAC address) to perform a longest-prefix-match lookup on hierarchically structured variable-length identifiers (HSVLIs).

An HSVLI indicates a piece of content, is hierarchically structured, and includes contiguous components ordered from a most general level to a most specific level. The length of a respective HSVLI is not fixed. Embodiments of the present invention involve hashing an HSVLI into multiple fixed-length keys usable with an exact-match engine, thereby facilitating fast forwarding by using existing network equipment. Hence, this system can use modified exact-match switching equipment, such as Ethernet switches, to forward packets with HSVLIs based on longest-prefix-match.

Embodiments of the present invention can also be applied to content-centric networks (CCNs). Content-centric networks—where routing is based on interests rather than addresses—bring a new approach to content transport. Instead of having network traffic viewed at the application level as end-to-end conversations over which content travels, content is requested or returned based in part on the name given to it, and the network is responsible for routing content from the provider to the consumer. Content includes data that can be transported in the communication system, and can be any form of data such as text, images, video, and/or audio. A consumer and a provider can be a person at a computer or an automated process inside or outside the network. In such a network, a piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In content-centric networks, unlike a conventional IP network, a packet may be identified by an HSVLI. For example, "abcd/bob/papers/ccn/news" could be the name of the content and identifies the corresponding packet(s); i.e., the "news" article from the "ccn" collection of papers for a user named "Bob" at the organization named "ABCD."

To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an interest in a piece of content and then send that interest to a node in network 180. The piece of content can be stored at a node in network 180 by a publisher or content provider, who can be located inside or outside the network. For example, in FIG. 1, the interest in a piece of content originates at node 105. If the content is not available at the node, the interest flows to one or more nodes coupled to the first node. For example, in FIG. 1, the interest flows (interest flow 150) to node 115, which does not have the content available. Next, the interest flows (interest flow 155) from node 105 to node 125, which again does not have the content. The interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the interest generation node (node 105) can participate in caching local copies of the content as it travels across the network. Caching reduces the network load for a second subscriber located in proximity to other subscribers by implicitly sharing access to the locally cached content Forwarding Packets with HSVLIs with Exact-Match Lookup Engines Conventional packet forwarding is based on addresses assigned to nodes (or interfaces of nodes). For example, in Ethernet forwarding, a 48-bit MAC address of an Ethernet frame is used for an exact-match lookup in a forwarding table to determine the output port on the switch for the frame. However, such exact-match lookup is not suitable for forwarding packets with HSVLIs. First, the Ethernet-style exact-match lookup can only handle fixed-length MAC addresses, whereas HSVLIs can have variable lengths. Second, Ethernet-style lookup engines can only perform exact-match lookups, whereas the hierarchical structure of an HSVLI calls for longest-prefix-match lookups.

This is because Ethernet switches are not designed to route packets across a large-scale network (such as the Internet) and are only intended to forward packets between small-scale networks (such as local-area networks). As a result, hierarchical routing is not a requirement in the original Ethernet protocol. However, packets with HSVLIs may travel across networks of any size (such as the Internet), and hierarchical routing is more suitable. For hierarchical routing, longest-prefix-match lookup is more efficient and scalable than exact-match lookup. In this disclosure, longest-prefix-match lookup refers to the process of performing a lookup that returns a result matching the largest number of components, from the highest to the lowest hierarchy, in an HSVLI.

As mentioned above, HSVLIs refer to content, and it is desirable that they be able to represent organizational structures for content and at least partially meaningful to humans. An individual component of a HSVLI may have an arbitrary length. Furthermore, HSVLIs can have explicitly delimited components, can include any sequence of bytes, and are not limited to human-readable characters.

A longest-prefix-match lookup is important in forwarding packets with HSVLIs. For example, an HSVLI indicating an interest in "/parc/home/smetters" will match both "/parc/home/smetters/test.txt" and "/parc/home/smetters/bar.txt." The longest match, in terms of the number of name components, is considered the best because it is the most specific. Embodiments of the present invention provide a mechanism to adapt an existing fixed-length, exact-match lookup engine so that it can perform a longest-prefix-match lookup with a variable-length HSVLI.

Figure 2:
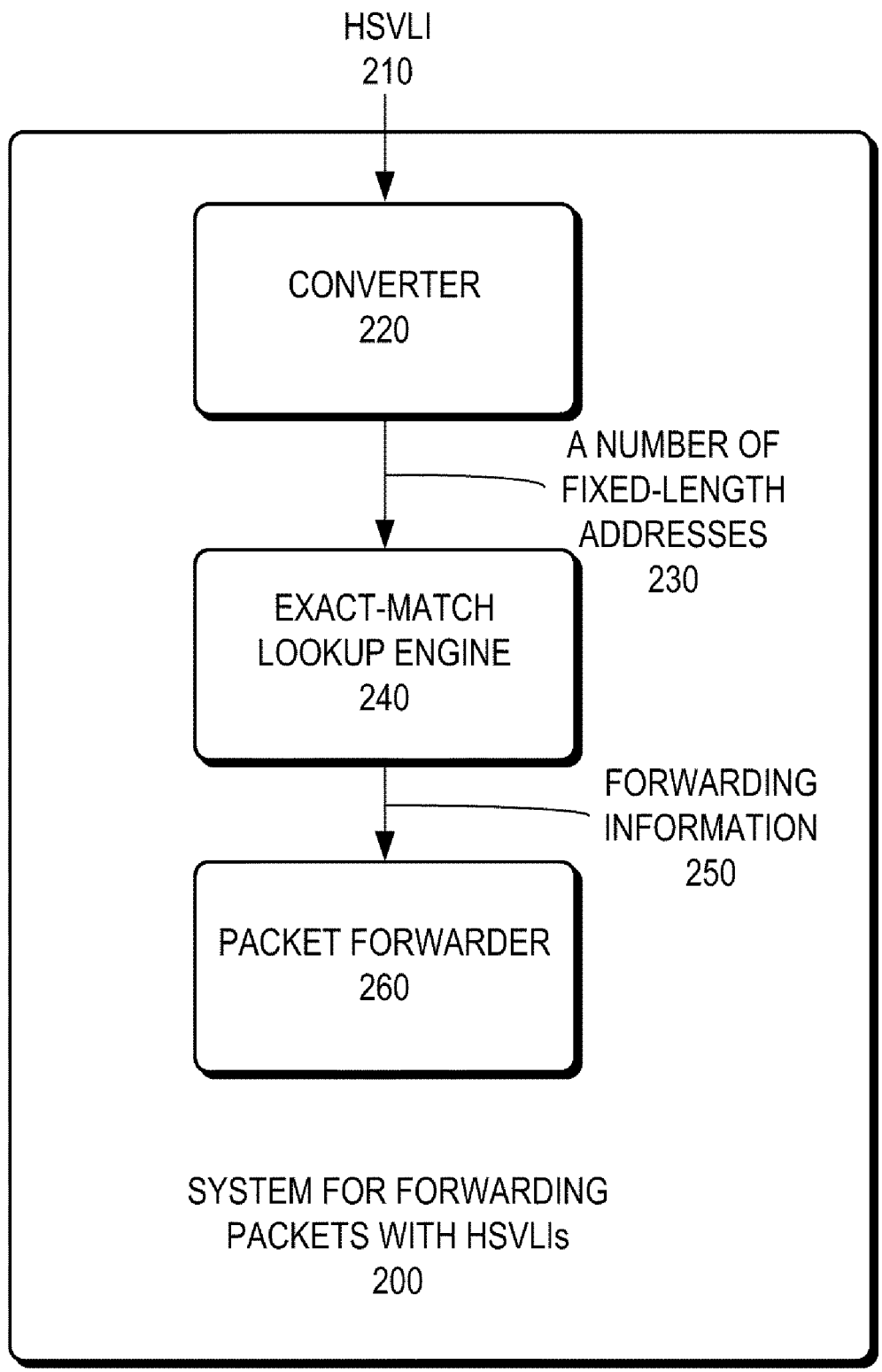
FIG. 2 illustrates an architecture of an exemplary system for adapting an exact-match lookup engine to HSVLIs in accordance with an embodiment.

FIG. 2 illustrates an overview of an exemplary system for adapting an exact-match lookup engine in accordance with an embodiment. A system 200 for forwarding packets with HSVLIs includes a HSVLI converter 220 and matcher 240. Converter 220 receives HSLVI 210. The HSVLI indicates a hierarchical structure of contiguous components ordered from a most general level to a most specific level. For example, a HSVLI might be "/a/b/c/d," where "/a" is the most general level and "/a/b/c/d" is the most specific level.

Next, while each component of the HSVLI is received at the switch, HSVLI converter 220 sequentially produces a number of fixed-length addresses 230 as input to an exact-match lookup engine 240. Exact-match lookup engine 240 can use the fixed-length addresses to search the forwarding table and produce forwarding information 250 which matches the largest number of components in the HSVLI. Hence, by performing multiple exact-matches with different number of components in a HSVLI, system 200 can perform an effective longest-prefix-match for HSVLIs. Forwarding information 250 can indicate at least one output port to which the packet can be forwarded.

In one embodiment, when an HSVLI is being received, the system can convert the HSVLI into multiple fixed-length addresses in real time, one for each prefix of the HSVLI. A prefix indicates one or more contiguous components beginning with a component at the most general level. For example, "/a/b" is a prefix of "/a/b/c/d," where "/a" is at the most general level and "a," "b," "c," and "d" are contiguous components. An HSVLI can have more than one prefix. For example, "/a/b/c" is also prefix of "/a/b/c/d."

The system then looks up a fixed-length encoding of each prefix in an exact-match lookup engine. The longest prefix whose encoding matches an entry in the exact-match lookup engine is the de-facto longest prefix match. The system generates multiple prefixes because the system does not a priori know which prefix, if any, will be found by the exact-match lookup engine.

Figure 3:
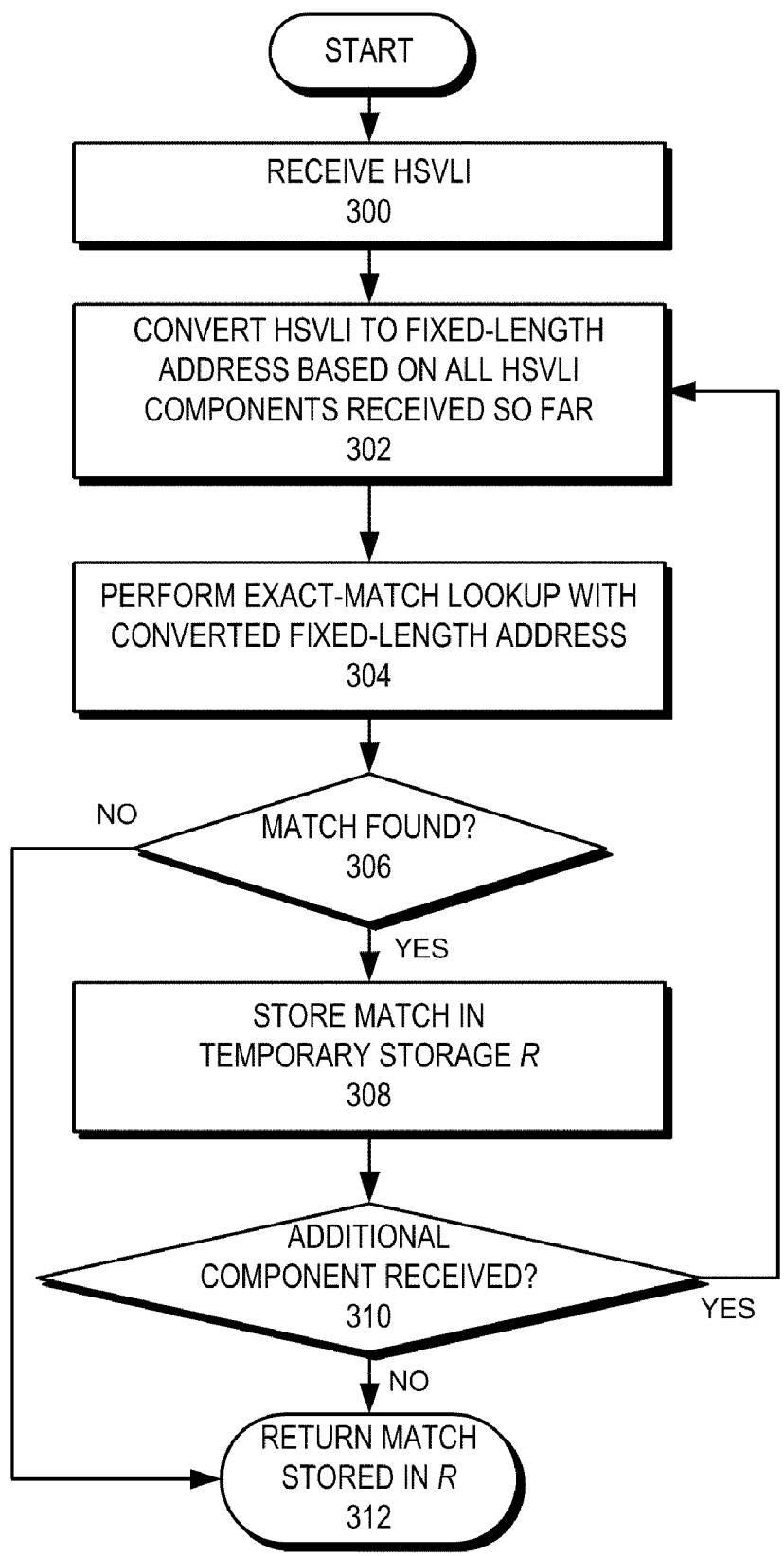
FIG. 3 presents a flowchart illustrating the process of performing an effective longest-prefix-match lookup for an HSVLI using an exact-match lookup engine, in accordance with one embodiment of the present invention.

FIG. 3 presents a flowchart illustrating the process of performing an effective longest-prefix-match lookup for an HSVLI using an exact-match lookup engine, in accordance with one embodiment of the present invention. During operation, the system receives an HSVLI (operation 300). The system then converts the HSVLI to a fixed-length address based on all HSVLI components received so far (operation 302). More details on such conversion are described in the sections below. Subsequently, the system performs an exact-match lookup with the converted fixed-length address (operation 304).

The system then determines whether a match, which contains the forwarding information, has been found (operation 306). If so, the system stores the match in a temporary storage R (operation 308). The system further determines whether an additional component for the HSVLI has been received (operation 310). If so, the system continues to generate a new fixed-length address (operation 302). If no additional component is received, or if no match is found (see branch operation 306), the system returns the match stored in R as the result of the effective longest-prefix-match lookup (operation 312). Note that if no match has ever been found for any fixed-length address, the system returns NULL.

In the example described above, it is assumed that the multiple exact-match lookups are performed sequentially, in real time, as each component of the HSVLI is received. It is also possible to perform the lookups after all or part of the components are received. For example, the system can wait until all the components of an HSVLI are received before performing the multiple exact-match lookups. The system can also wait until a certain number (but not all) of components are received before performing the exact-match lookups.

Converting an HSVLI into a Fixed-Length Address

Figure 4:
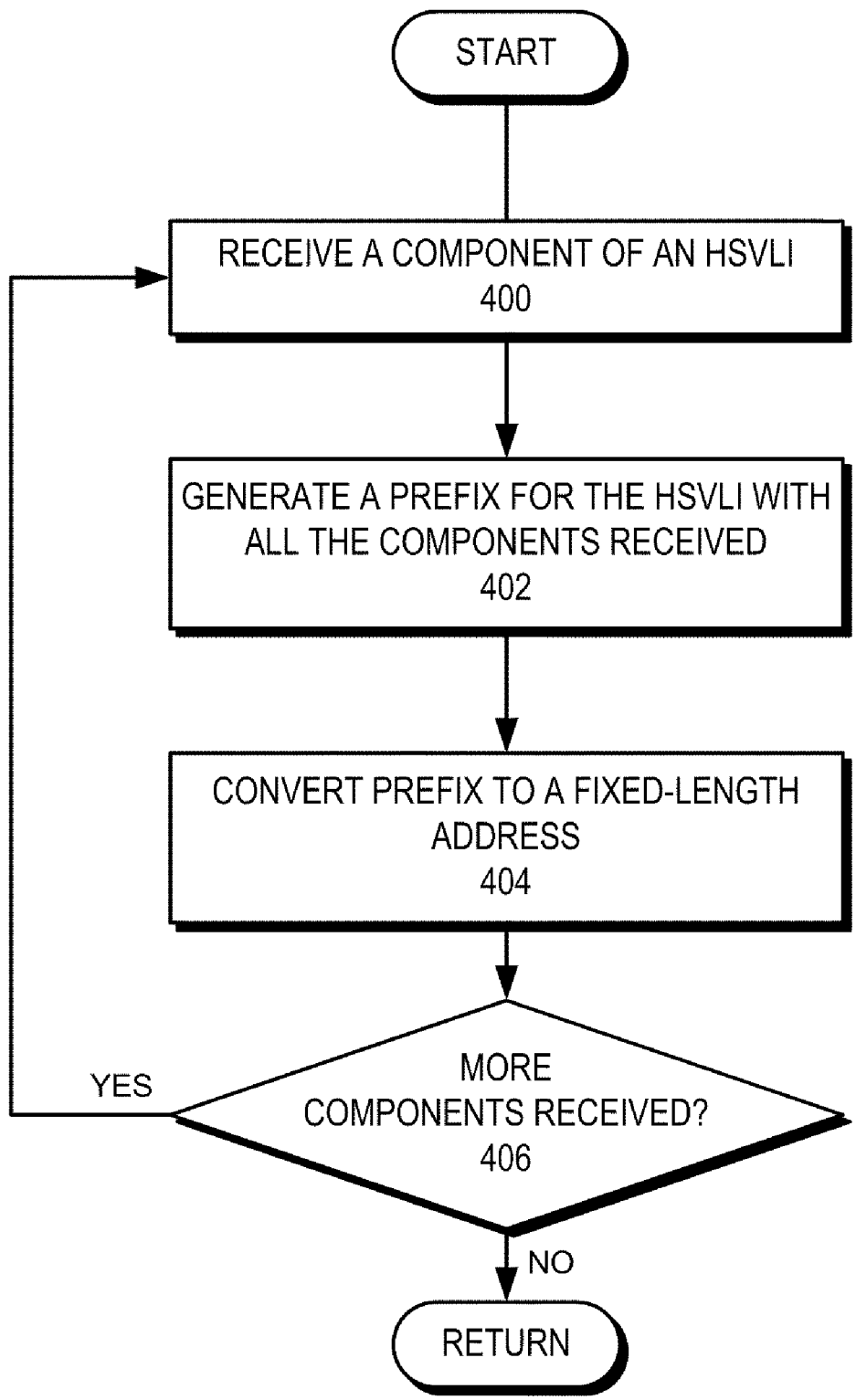
FIG. 4 presents a flowchart illustrating the process of converting the HSVLI into a number of fixed-length addresses in accordance with an embodiment.

Recall from the previous section that the system converts the HSVLI into a number of fixed-length addresses. In one embodiment, the system generates prefixes of an HSVLI as the components are received one after another. Each prefix is then converted into a fixed-length address. FIG. 4 presents a flowchart illustrating the process of converting the HSVLI into a number of fixed-length addresses in accordance with an embodiment. During operation, the system receives a component of an HSVLI (operation 400). The system then generates a prefix for the HSVLI with all the components received (operation 402). The system further converts the prefix to a fixed-length address (operation 404). Subsequently, the system determines whether more components of the HSVLI are received (operation 406). If so, the system repeats the above process (operation 400). Otherwise, the system returns.

Figure 5:
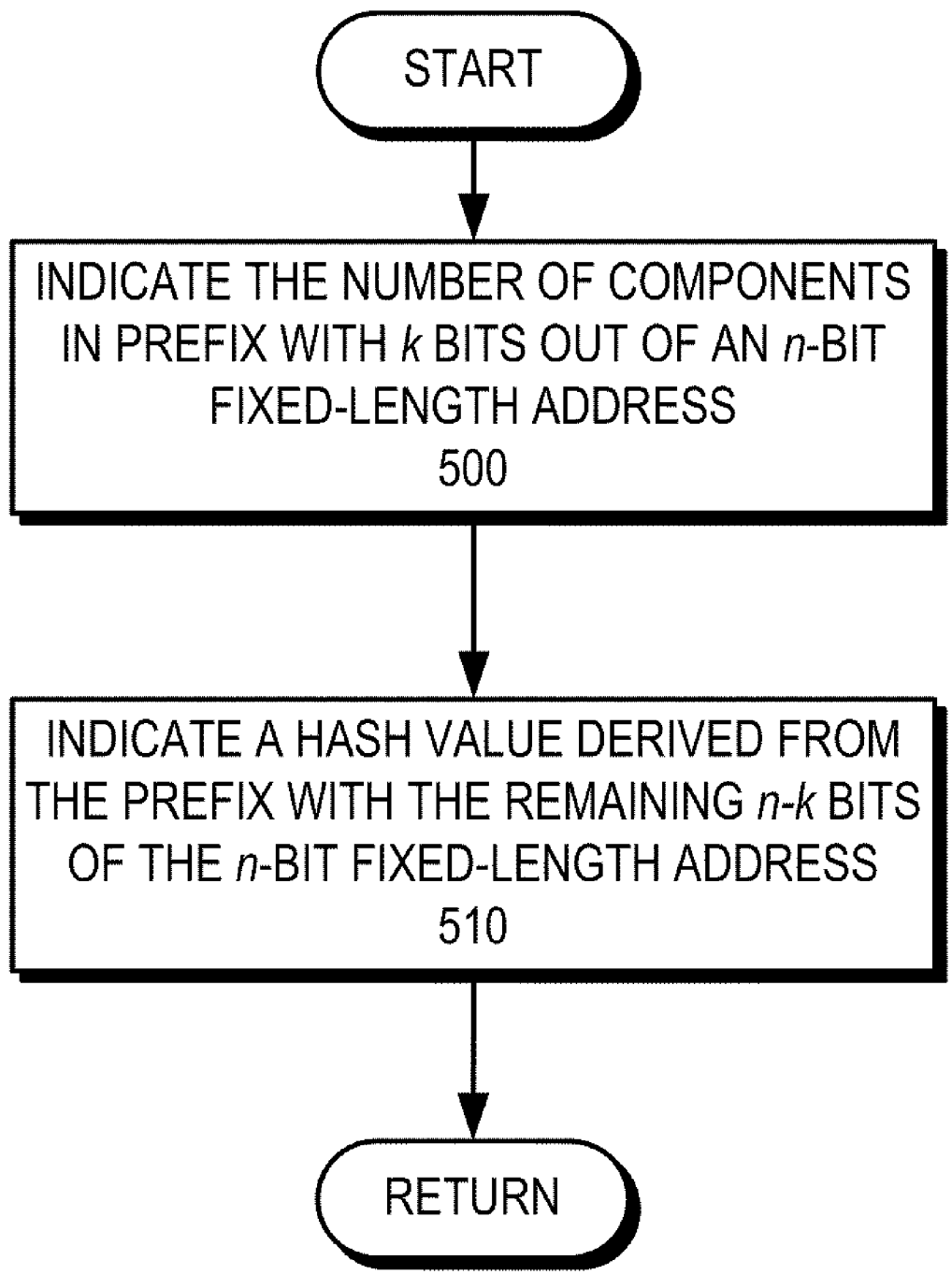
FIG. 5 presents a flowchart illustrating the process of converting a respective prefix in accordance with an embodiment.

In one embodiment, to convert a given prefix to a fixed-length address, the system performs the following operation. Assume that the fixed-length address is n-bit long (e.g., n=48 in the case of an Ethernet MAC address). Out of these n bits, k bits are reserved to indicate the number of components included in the prefix. The system then hashes the prefix and places the hash value in the rest n–k bits. FIG. 5 presents a flowchart illustrating this process. During operation, the system indicates the number of components in the prefix with k bits out of the n-bit fixed-length address (operation 500). For example, the system would indicate "3" as the number of components in prefix "/a/b/c" with k bits. The value of k can depend on the maximum number of components for HSVLIs. Next, the system indicates a hash value derived from the prefix with the remaining n–k bits of the n-bit fixed-length address (operation 510). The system can use various hashing methods, including a cyclic-redundancy check on the prefix.

Figure 6:
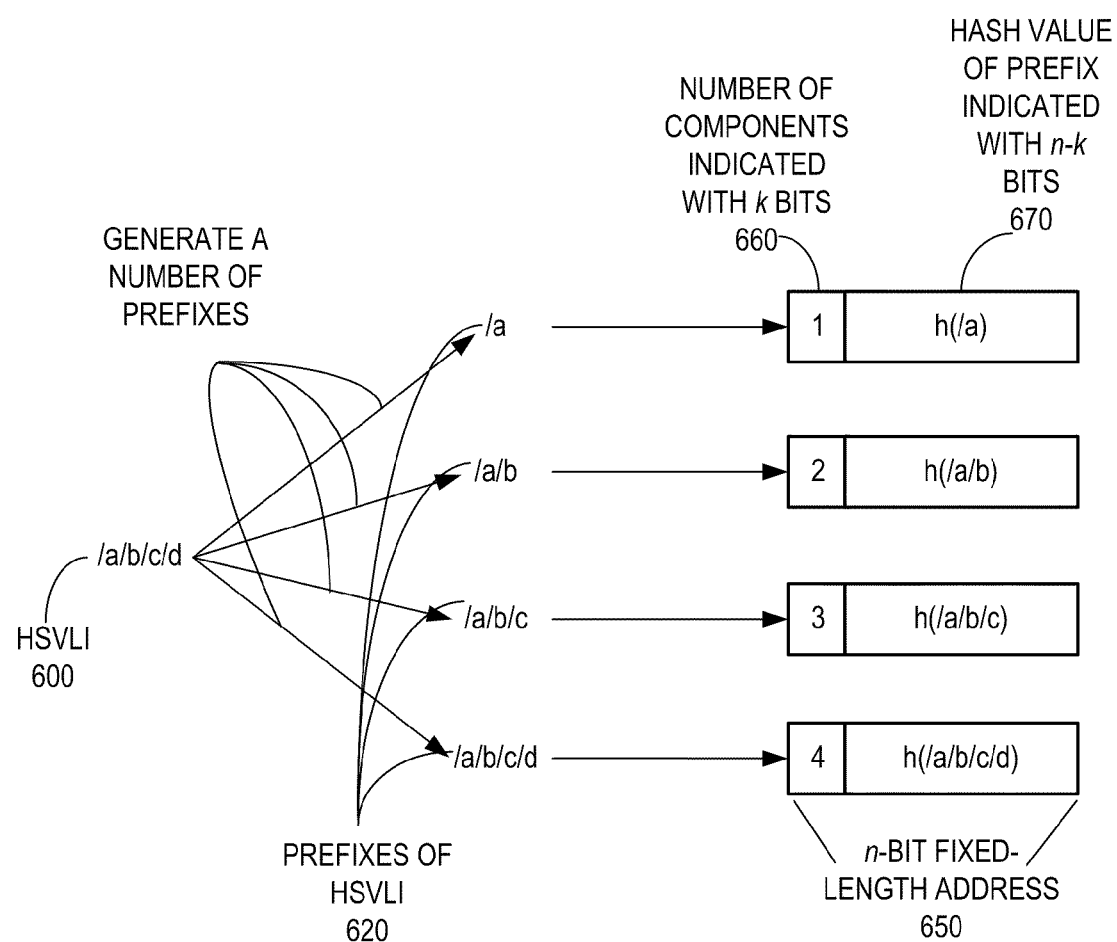
FIG. 6 illustrates an exemplary HSVLI converted to a number of fixed-length addresses in accordance with an embodiment.

FIG. 6 illustrates an exemplary HSVLI converted to a number of fixed-length addresses in accordance with an embodiment. HSVLI 600 "a/b/c/d" can produce a number of prefixes 620. Prefixes 620 of HSVLI 600 include "/a," "/a/b," "/a/b/c," and "/a/b/c/d." Each of these prefixes can be converted into an n-bit fixed-length address, such as address 650. For example, the system converts "/a" into an n-bit fixed-length address with "1" as the number of components indicated with k bits 660 and "h(/a)" as the hash value of the prefix, indicated with n–k bits 670. Note that "h(/a)" is a shorthand notation for the "hash of a," which is the hash value derived from prefix "/a." As mentioned above, various methods can be used to derive a hash value from a prefix. Other prefixes in FIG. 6 can be similarly converted to n-bit fixed-length addresses.

Figure 7:
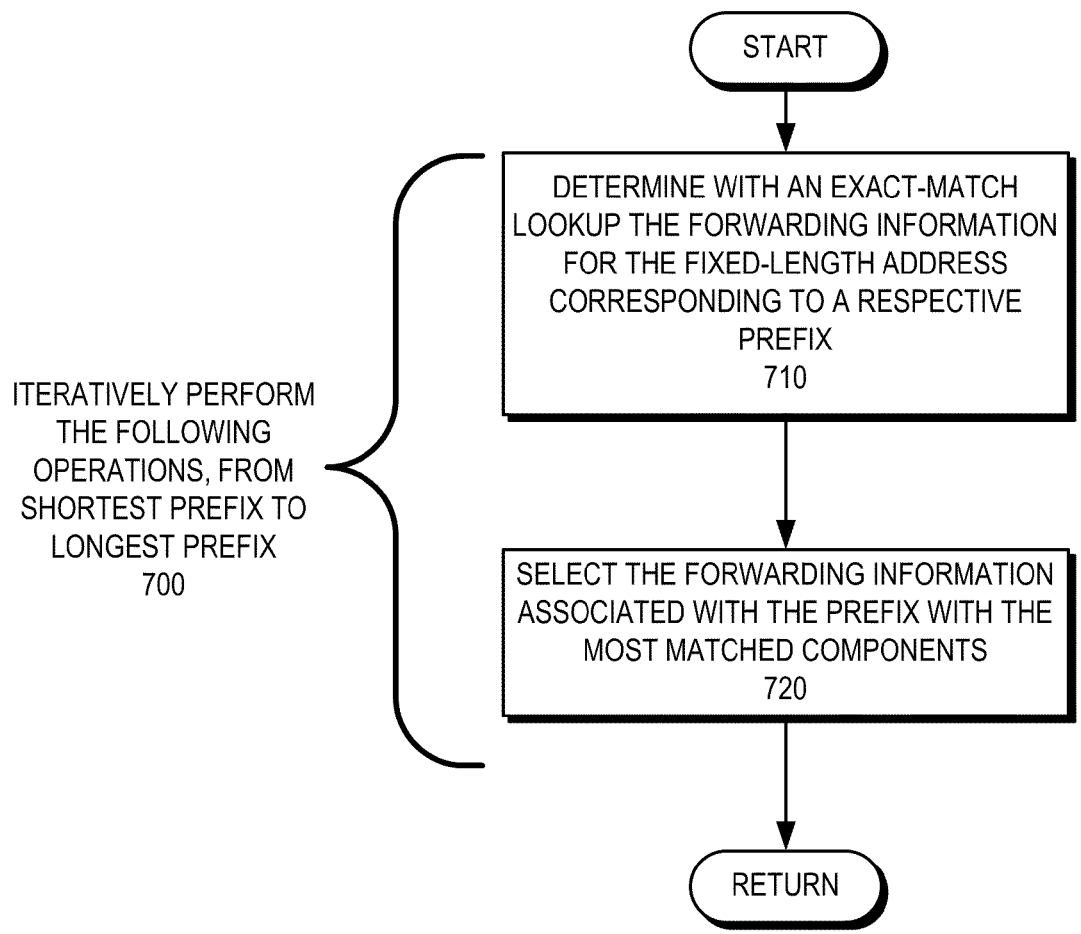
FIG. 7 presents a flowchart illustrating the process of performing an effective longest-prefix match using an exact-match lookup engine with the number of fixed-length addresses, in accordance with an embodiment.

FIG. 7 presents a flowchart illustrating the process of performing an effective longest-prefix match using the exact-match lookup engine with the number of fixed-length addresses, in accordance with an embodiment. The system iteratively performs the following operations, from shortest prefix to longest prefix (operation 700). The system first determines with an exact-match lookup the forwarding information for the fixed-length address corresponding to a respective prefix (operation 710). The system then selects the forwarding information associated with the longest matched prefix (operation 720). Because the system selects forwarding information associated with the longest matched prefix, the system can determine the longest-matching prefix by using an exact-match lookup.

Note that the system can perform operations 710 and 720 iteratively after all the components have been received. For example, the system can perform these operations from longest to shortest prefix. The system can also perform these operations in parallel. Regardless of the order in which the prefixes are processed, the system need only return the forwarding information associated with the longest matched prefix.

Figure 8A:
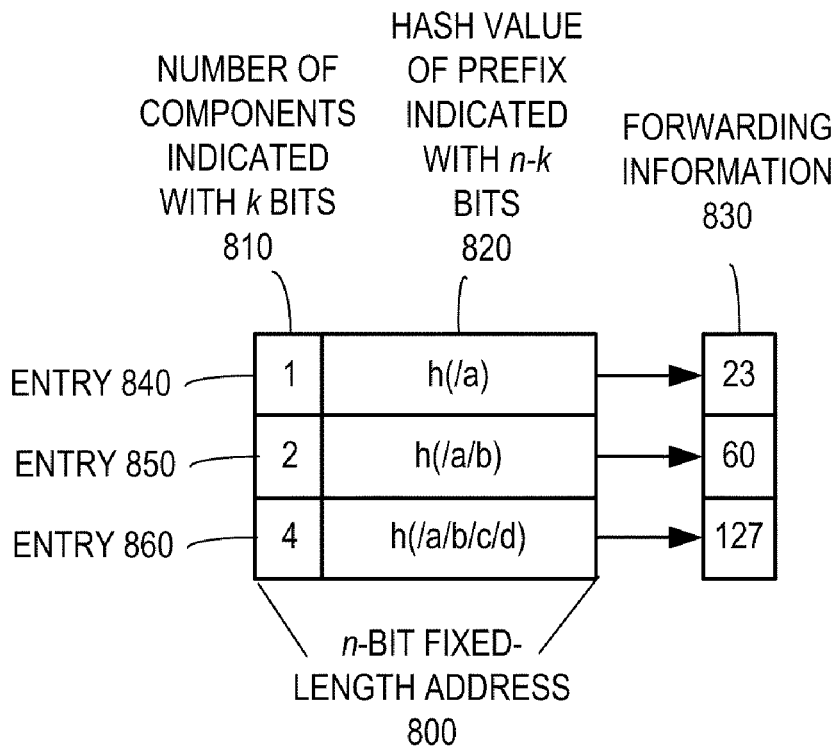
FIG. 8A illustrates an exemplary conceptual view of an exact-match lookup engine, in accordance with an embodiment.

FIG. 8A illustrates an exemplary conceptual view of an exact-match lookup engine in accordance with an embodiment. This figure shows an n-bit fixed-length addresses 800, which can store both the number of components with k bits (element 810) and the hash value of a prefix with n–k bits (element 820). The figure also shows forwarding information 830, which can indicate the indices of one or more output ports. For example, "23" represents output port number 23. Entries 840-860 show the entries which can be stored in a lookup table and be searched by the exact-match lookup engine. For example, entry 840 shows that a fixed n-bit address with the first k bits indicating "1" and the rest n–k bits indicating "h(/a)" corresponds to output port 23 Similarly, entry 850 shows that a fixed n-bit address with the first k bits indicating "2" and the rest n–k bits indicating "h(/a/b)" corresponds to output port 60.

Continuing with this conceptual view of a lookup engine, suppose that HSVLI "/a/b/c/d" has been appropriately converted into a number of n-bit fixed-length addresses from all its prefixes. The system will then return "127" as the forwarding information associated with the longest-matched prefix.

As described above, the system can use a single memory location R to hold the longest-prefix match found so far, if the system performs the exact-match lookup from the shortest prefix to the longest prefix. After the system converts each prefix, it can perform a lookup and if a match is found, replace the previous value of R with the new forwarding information. After the system has performed the lookup for the longest prefix, R will hold forwarding information corresponding to the longest-prefix match.

In one embodiment, the forwarding information can include the index of the next-available match in the lookup engine based on a common sub-prefix. For example, in FIG. 8, the forwarding information for entry 850 can include a pointer to entry 860. The system can exploit this next-available-match by avoiding a lookup with a given number of components when the lookup engine does not contain an entry for that given number of components. For example, the system can avoid looking up the n-bit conversion of "/a/b/c," which has three components and which does not exist in the lookup engine. The iteration in FIG. 7 can be modified to skip certain prefix lengths as indicated by the forwarding information. Once the lookup engine has matched the n-bit conversion of "/a/b," which has two components, the next-available match can be "/a/b/c/d," which has four components. When returned as part of the forwarding information, the index of the next-available match enables the system to avoid looking up the n-bit conversion of "/a/b/c," which has three components.

Figure 8B:
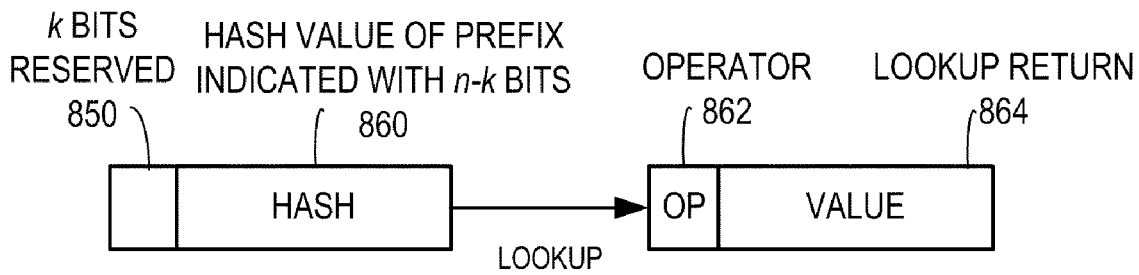
FIG. 8B illustrates an exemplary mechanism for using lookup result to facilitate subsequent lookups for an HSVLI, in accordance with one embodiment of the present invention.

In some embodiments, the lookup result can include some feedback information that can facilitate subsequent lookups when the components of an HSVLI are received. For example, the system can allocate k bits out of n bits as reserved bits. The lookup result can contain an operator that can be used to guide the subsequent lookups. FIG. 8B illustrates an exemplary mechanism for using the lookup result to facilitate subsequent lookups for an HSVLI, in accordance with one embodiment of the present invention. In this example, as the components of an HSVLI are received, the system produces a number of n-bit fixed-length addresses. Each address includes k reserved bits 850, and n–k bits 860 to store a hash value of a prefix. The lookup process produces a result that includes two parts: an operator 862 and a lookup return value 864 (which can include the output port information). Based on the value of operator 862, the system can perform different operations with regard to subsequent lookups when more components of the HSVLI are received.

In one embodiment, operator 862 can indicate at least the following operations: "match," "match and done," "done," "load literal," and "need m components."

When operator 862 indicates a "match," it means that a match has been identified by the lookup, and there can be a further match in the lookup table with the same prefix. In other words, the system is expected to perform another lookup when additional component(s) of the HSVLI are received, since it is possible that the lookup can produce a match for a longer prefix.

When operator 862 indicates "match and done," it means that a match has been identified, and there are no other matches in the lookup table for a longer prefix. Therefore, the system does not need to perform further lookups when additional component(s) of the HSVLI are received. This indication can reduce the processing burden on the system When operator 862 indicates "done," it means that no match has been identified, and there are no other matches in the lookup table for a longer prefix. Therefore, the system does not need to perform further lookups for the same HSVLI.

When operator 862 indicates "load literal," it means that the current prefix whose hash is used as a key for the search results in a match, and that the system is expected to load a pre-determined value (i.e., the literal value) to the k reserved bits in the fixed-length addresses generated for subsequent lookups. This option can be used when the prefix contains one or more high-level common components which initially generate a match, so that when additional components are received, the subsequent lookups would be based on a key that includes the loaded literal in the k reserved bits. For example, when the system receives the first component of a name "/parc.com/," the system issues a normal lookup based on this prefix and finds a match. The lookup result indicates that the subsequent prefixes generated for the same name should contain a literal value in the k reserved bits. This way, the literal value loaded in the reserved bits can prevent false matches in subsequent lookups due to hash-value collisions.

When operator 862 indicates "need m components," it means that a match of the current prefix is identified, and the next match for a longer prefix for the same HSVLI will require m components. Correspondingly, the system does not have to perform any lookup until m components for the same HSVLI have been received. Note that if no match is found for the m components, then the previous match would be regarded as the best match, and no further lookups are necessary.

Lookup Engine

In one embodiment, the lookup engine performs exact-match lookup of the n-bit fixed-length address. The lookup engine can include one or more of a hash table, a direct lookup array, and a binary content addressable memory (CAM). A CAM is a memory where each storage location has a comparator for each bit so that the CAM can search for an input value in parallel across all content locations, returning a match with an associated value in one cycle. A binary CAM performs an exact-match lookup for an input word; this can be used, for example, in an Ethernet switch that needs to look up the output port for a given 48-bit MAC address. A direct lookup array stores forwarding information for each n-bit address associated with a prefix. A hash table stores this information more compactly by allowing collisions among multiple n-bit addresses. That is, the direct lookup array is a one-to-one mapping, whereas the hash table is a many-to-one mapping.

Figure 9:
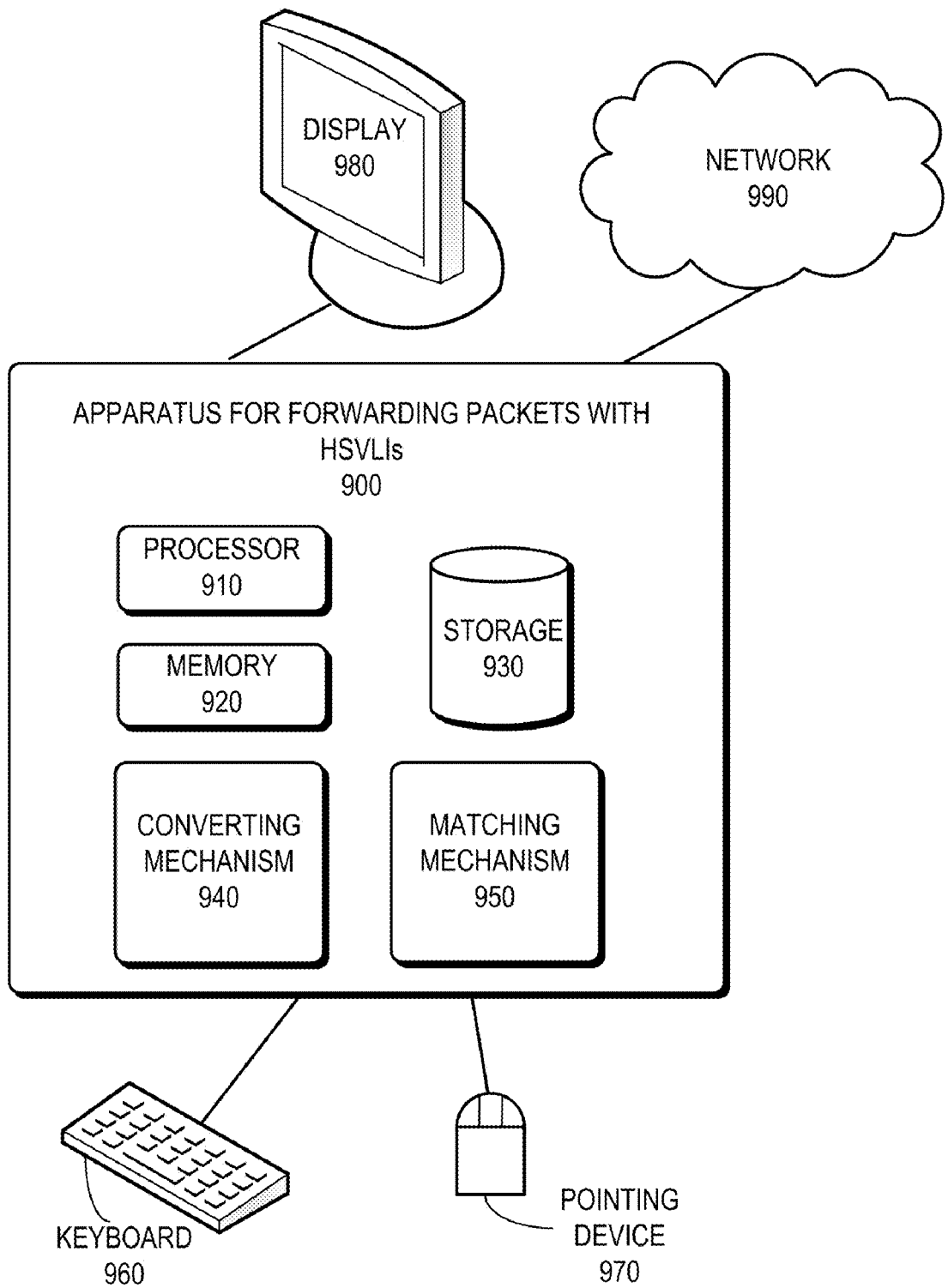
FIG. 9 illustrates an exemplary apparatus for forwarding packets with HSVLIs, in accordance with an embodiment.

FIG. 9 illustrates an exemplary apparatus for forwarding packets with HSVLIs in accordance with an embodiment. An apparatus 900 for forwarding packets with HSVLIs comprises a processor 910, a memory 920, a storage 930, a converting mechanism 940, and a matching mechanism 950, all of which can be in communication with each other through various means.

In some embodiments, mechanisms 940-950 can be part of processor 910. Further, in some embodiments, the system may not include a separate processor and memory. Instead, in addition to performing their specific tasks, mechanisms 940-950, either separately or in concert, may be part of general- or special-purpose computation engines.

Storage 930 stores programs to be executed by processor 910. Specifically, storage 930 stores a program that implements a system (application) for adapting an exact-match lookup engine to HSVLIs. During operation, the application program can be loaded from storage 930 into memory 920 and executed by processor 910. As a result, apparatus 900 can perform the functions described above. Apparatus 900 can be coupled to an optional display 980, keyboard 960, and pointing device 970.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer executable method for forwarding packets with hierarchically structured variable-length identifiers (HSVLIs), the method comprising:

converting, by a computer, an HSVLI into a number of fixed-length addresses,
wherein the HSVLI identifies a piece of content, and comprises contiguous components ordered in a hierarchy from a most general level of the hierarchy to a most specific level of the hierarchy; and
performing a longest-prefix-match lookup for forwarding a packet associated with the piece of content by performing multiple exact-match lookups based at least on the fixed-length addresses.

2. The method of claim 1, wherein converting the HSVLI into a number of fixed-length addresses comprises:

generating a number of prefixes of the HSVLI, wherein a respective prefix indicates one or more contiguous components beginning with a component at the most general level; and
converting each prefix of the HSVLI into at least one fixed-length address.

3. The method of claim 2, wherein converting each prefix comprises:

indicating the number of components in the prefix with a predetermined number of bits out of the fixed-length address; and indicating a hash value derived from the prefix with the remaining bits of the fixed-length address.

4. The method of claim 2, wherein performing the effective longest-prefix match comprises:
iteratively performing the following operations, from the shortest prefix to the longest prefix:
determining forwarding information for the fixed-length address corresponding to a respective prefix using an exact-match lookup; and
selecting forwarding information associated with the prefix with the most components, which has been determined with the exact-match lookup.

5. The method of claim 4, wherein the forwarding information indicates at least one output port.

6. The method of claim 4, wherein the exact-match lookup returns a result that includes one or more of the following indications:
whether a match is found;
whether a match is found and a further match is available for a prefix with additional components;
the number of additional components needed to obtain a further match for a prefix with additional components; and
a literal value corresponding to a match for the prefix, wherein the literal value can be loaded into a number of reserved bits in the fixed-length address, thereby facilitating subsequent lookups and reducing the chance of address collisions.

7. The method of claim 1, wherein the exact-match lookup is performed by an exact-match lookup engine; and
wherein the exact-match lookup engine comprises one or more of:
a hash table;
a direct lookup array; and
a binary content-addressable memory (CAM).

8. The method of claim 1, wherein a respective contiguous component in the HSVLI comprises one or more of:
a globally routable name;
an organizational name;
a version identifier; and
a digest.

9. An apparatus for forwarding packets with hierarchically structured variable-length identifiers (HSVLIs), the apparatus comprising:
a processor;
a memory;
a converting mechanism configured to convert an HSVLI into a number of fixed-length addresses,
wherein the HSVLI identifies a piece of content, and comprises contiguous components ordered in a hierarchy from a most general level of the hierarchy to a most specific level of the hierarchy; and
a lookup mechanism configured to perform a longest-prefix-match lookup for forwarding a packet associated with the piece of content by performing multiple exact-match lookups based at least on the fixed-length addresses.

10. The apparatus of claim 9, wherein while converting the HSVLI into a number of fixed-length addresses the converting mechanism is configured to:
generate a number of prefixes of the HSVLI, wherein a respective prefix indicates one or more contiguous components beginning with a component at the most general level; and
convert each prefix of the HSVLI into at least one fixed-length address.

11. The apparatus of claim 10, wherein while converting each prefix the converting mechanism is configured to:
indicate the number of components in the prefix with a predetermined number of bits out of the fixed-length address; and
indicate a hash value derived from the prefix with the remaining bits of the fixed-length address.

12. The apparatus of claim 10, wherein while performing the effective longest-prefix match, the matching mechanism is configured to:
iteratively perform the following operations, from the shortest prefix to the longest prefix:
determine forwarding information for the fixed-length address corresponding to a respective prefix using an exact-match lookup; and
select forwarding information associated with the prefix with the most components, which has been determined with the exact-match lookup.

13. The apparatus of claim 12, wherein the exact-match lookup returns a result that includes one or more of the following indications:
whether a match is found;
whether a match is found and a further match is available for a prefix with additional components;
the number of additional components needed to obtain a further match for a prefix with additional components; and
a literal value corresponding to a match for the prefix, wherein the literal value can be loaded into a number of reserved bits in the fixed-length address, thereby facilitating subsequent lookups and reducing the chance of address collisions.

14. The apparatus of claim 12, wherein the forwarding information indicates at least one output port.

15. The apparatus of claim 9, wherein the exact-match lookup is performed by an exact-match lookup engine; and
wherein the exact-match lookup engine comprises one or more of:
a hash table;
a direct lookup array; and
a binary content-addressable memory (CAM).

16. The apparatus of claim 9, wherein a respective contiguous component in the HSVLI comprises one or more of:
a globally routable name;
an organizational name;
a version identifier; and
a digest.

17. A non-transitory computer-readable storage device storing instructions that when executed by a computer cause the computer to perform a method for forwarding packets with hierarchically structured variable-length identifiers (HSVLIs), the method comprising:
converting an HSVLI into a number of fixed-length addresses,
wherein the HSVLI identifies a piece of content, and comprises contiguous components ordered in a hierarchy from a most general level of the hierarchy to a most specific level of the hierarchy; and
performing an effective longest-prefix-match lookup by performing multiple exact-match lookups based at least on the fixed-length addresses.

18. The device of claim 17, wherein converting the HSVLI into a number of fixed-length addresses comprises:
generating a number of prefixes of the HSVLI, wherein a respective prefix indicates one or more contiguous components beginning with a component at the most general level; and converting each prefix of the HSVLI into at least one fixed-length address.

19. The device of claim 18, wherein converting each prefix comprises:
   indicating the number of components in the prefix with a predetermined number of bits out of the fixed-length address; and
   indicating a hash value derived from the prefix with the remaining bits of the fixed-length address.

20. The device of claim 18, wherein performing the effective longest-prefix match using comprises:
   iteratively performing the following operations, from the shortest prefix to the longest prefix:
      determining forwarding information for the fixed-length address corresponding to a respective prefix using an exact-match lookup; and
      selecting forwarding information associated with the prefix with the most components, which has been determined with the exact-match lookup.

21. The device of claim 20, wherein the exact-match lookup returns a result that includes one or more of the following indications:
   whether a match is found;
   whether a match is found and a further match is available for a prefix with additional components;
   the number of additional components needed to obtain a further match for a prefix with additional components; and
   a literal value corresponding to a match for the prefix, wherein the literal value can be loaded into a number of reserved bits in the fixed-length address, thereby facilitating subsequent lookups and reducing the chance of address collisions.

22. The device of claim 20, wherein the forwarding information indicates at least one output port.

23. The device of claim 17, wherein the exact-match lookup is performed by an exact-match lookup engine; and
   wherein the exact-match lookup engine comprises one or more of:
   a hash table;
   a direct lookup array; and
   a binary content-addressable memory (CAM).

24. The device of claim 17, wherein a respective contiguous component in the hierarchical HSVLI comprises one or more of:
   a globally routable name;
   an organizational name;
   a version identifier; and
   a digest.

* * * * *